Patented July 17, 1934

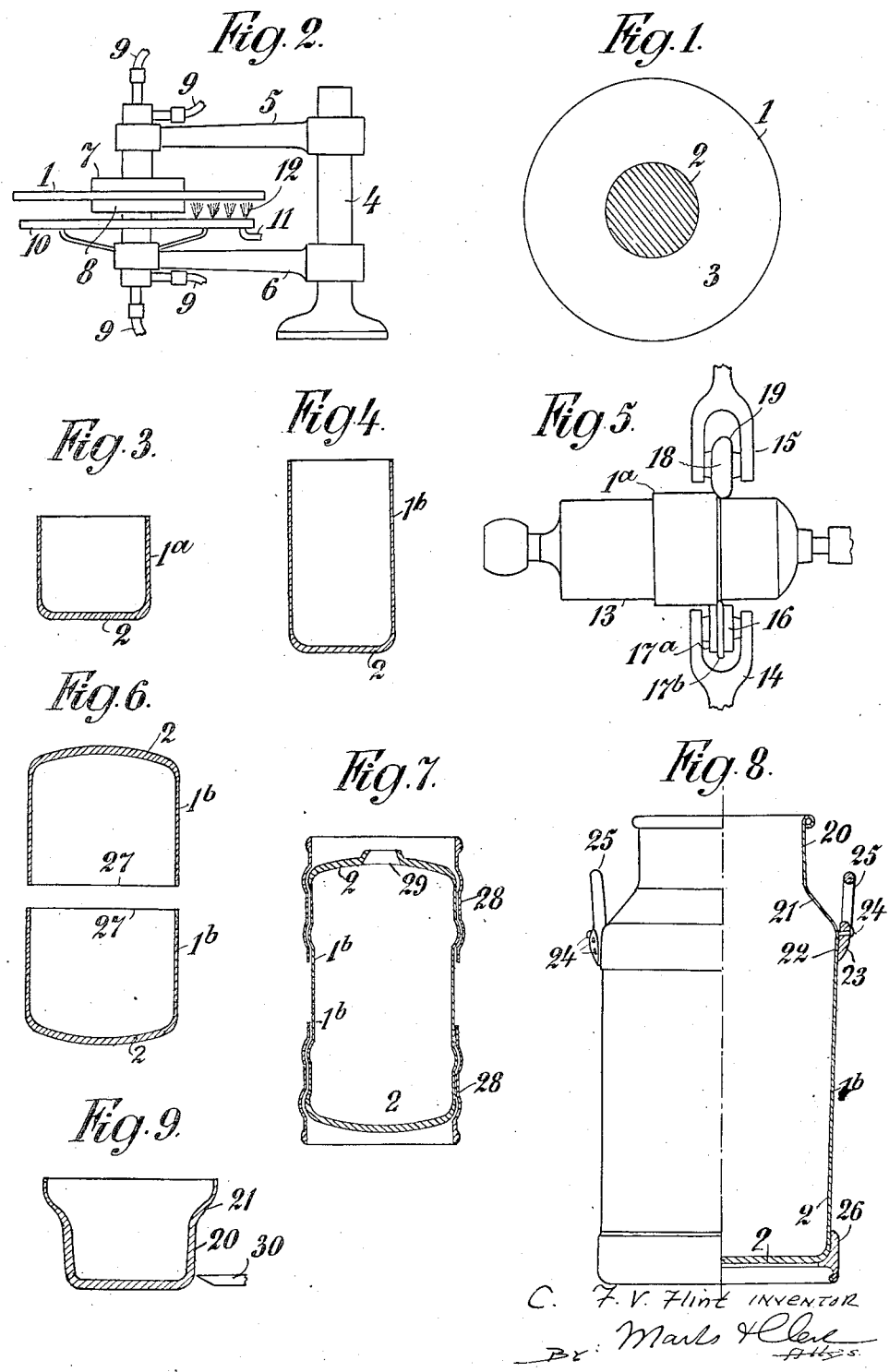

1,966,713

UNITED STATES PATENT OFFICE 1,966,713

PROCESS FOR THE MANUFACTURE OF METAL CONTAINERS

Charles Frederik Vilhelm Flint, Copenhagen, Denmark

Application October 14, 1929, Serial No. 399,625
In Denmark October 22, 1928

6 Claims. (Cl. 29—148.2)

The invention relates to containers of aluminium or a similar material, as e. g. transport pails, milk coolers, barrels, or the like, and to a process for making these containers. By containers of the present kind it is a principal matter to get strong and solid bottoms, the bottoms being the most exposed parts of the containers, partly because they are often hurt against the floor or the earth, partly, in the case of containers having to support high pressures, because the influences are much greater upon the bottoms than upon those parts of the containers which are cylindrical or otherwise shaped as bodies of revolution. In the case of containers having a neck it is also an important point to get this neck strong and solid as it is also exposed to vigorous influences. When the container is to be emptied into a vat or the like, the neck is often damaged by striking against sharp edges, so that dents and deformations are formed, making the removal of the lid very difficult if the neck is not specially resistant. In the known containers the bottom is generally made separately from heavy materials whereafter it is welded to an open cylinder made from a thinner material. This process has, however, the deficiency that the bottom, even if made from hard aluminium, gets soft owing to the heating to which it must necessarily be exposed during the welding. According to the invention the drawbacks of the known containers are avoided, and at the same time the manufacture of the container is extraordinarily simple and cheap. The invention is characterized principally in that the whole or lower part of the container which is made of aluminium or the like is integral with the bottom, i. e. without joints between the bottom and the adjacent part of the container, and so that the material of the whole bottom or a portion thereof is harder than the material of the container wall itself. The invention is further characterized in that in a container with a neck the latter and the adjacent portion of the container are in a similar manner integral, and the material of the whole or a part of the neck has a harder consistence than the material of the container wall itself. The bottom and the neck of the container are preferably also thicker than the proper wall, e. g. twice as thick. More accurately stated the container may be characterized in that itself or the bottom with adjacent greater or smaller parts of the wall of the container is pressed up from a plate or disc, the central part of which (corresponding to the bottom) is hard, while the outer annular part thereof (corresponding to the wall) is softened. Similarly in containers having a neck the latter and adjacent greater or smaller portions of the wall of the container may be made from a blank, of which that part corresponding to the neck is hard, while the part corresponding to the wall is softened. The edges of the walls connected with the bottom portion and neck portion respectively may be assembled by welding in the known manner. The manufacture of barrels or the like takes place in a similar manner by welding along the edges of two container portions each consisting of a hard bottom portion and a softer wall portion integral therewith.

According to the invention I proceed with the manufacture of the container or the container portion in that manner that as a blank I take a hard-rolled disc of aluminium or the like, of which disc only the outer annular part, which is to be prepared, is annealed, while the central part which shall form the bottom is held cooled so as to remain hard, whereafter the disc is shaped in usual manner by means of punchers and dies to the desired container shape. After the pressing the container wall is preferably rolled and thinned in a rolling bench having a carrier with the same outer diameter as the inner diameter of the container by means of two or more rolls situated on suitable places relatively to the carrier (e. g. two rolls situated diametrically opposite to each other), one or more of which rolls have a rib thinning the material while the other or others have a rounded shape and serve to prevent bulging of the material and to smooth the thinned material. In this manner it is possible to thin the wall and thereby at the same time to stretch it suitably in a single operation, contrary to what is else the case by the employment of the hitherto used common rolls, by which a suitable thinning and stretching of the material requires a great number of consecutive rollings, each rolling giving as a maximum a radial thinning of ¼ line, while the process according to the invention may give in a single operation a thinning of 1–1½ lines. The invention is represented in the drawing, where Fig. 1 shows a blank for the manufacture of a container without neck or for the lower portion of a container, Fig. 2 represents a device for partially annealing the disc. Fig. 3 is a sectional elevation of the container after its being pressed up, Fig. 4 is a similar view after the thinning and stretching of the wall of the container, Fig. 5 shows a device by which the said thinning and stretching is carried out, Fig. 6 is a sectional elevation of two elements of a barrel, Fig. 7 is a sectional elevation of a ready barrel, Fig. 8 is an elevation, partly in section, of a container with neck according to the invention, and Fig. 9 shows a stage of the manufacture of its neck portion. All of the drawing is diagrammatic. Referring now to Fig. 1, 1 is the circular blank of the container, which consists of a hard rolled aluminium disc. Its central portion 2 corresponds to the bottom of the container to be left hard, while the surrounding annular portion 3 is that part which has to be prepared to form the cylindrical wall. The device shown in Fig. 2 for annealing the annular portion 3 of the disc 1 consists of a frame 4 having arms 5, 6, one of which— e. g. 6—may be stationary, while the arm 5 may be displaceable, so as to be moved up and down and secured in any required position. To the arms 5, 6 are connected two round bodies 7, 8, the diameter of which corresponds to the diameter of the hatched area 2 in Fig. 1. The bodies 7, 8 are kept cooled by e. g. water cooling, the water being supplied and let out through pipes 9. One or more annular gas burners 10 with supply pipe 11 are secured to the frame, e. g. to the stationary arm 6. The gas outlets are suitably distributed relatively to the annular portion 3 of the plate 1, so that an even heating of the said portion for its annealing (softening) is obtained, by the flames 12. Instead of gas heating any other heating methods may be chosen, as e. g. by superheated steam or electricity. Because of the central portion 2 being clamped between the cooled bodies 7, 8, which must have a great thermal conductivity, this portion 2 is kept at a low temperature so as to retain its hardness. When the container has been annealed and cooled it is pressed up in the usual manner, whereby the container gets the form shown in Fig. 3. 1ª is the wall of the container. As shown in Fig. 5, the container is then placed upon the carrier 13 of a bench, where the wall 1ª is thinned. This is carried out e. g. by two rolls 16, 18 mounted in forks 14, 15 and pressed against the wall from opposite sides. The forks 14, 15 may be connected preferably by a spindle the ends of which are oppositely threaded, so that the rotation of the spindle presses the rolls towards the container wall simultaneously. The slide that carries the roll carriers being moved parallel with the axis of the container and away from its bottom, the roll 16 will displace and at the same time thin the material by means of the rib 17ᵇ projecting from its cylindrical part 17ª, while the roll 18 situated at the opposite side and having a surface 19 the generatrix of which is an evenly bent curve prevents the material from bulging and serves at the same time to smooth the thinned wall 1ᵇ. If the rolling is continued to the open end of the container, the latter gets the shape shown in Fig. 4, where the wall 1ᵇ is thinned all over its length. It may, however, often be practical to stop the thinning at a suitable distance from the opening of the wall, so that a thicker ring is left at the top of the container, this thicker portion being then employed for the fixation of grips, ears or the like. It is to be remarked that when the container has been pressed up into the shape shown in Fig. 3, it may again be annealed, if wanted, which may take place also, if wanted, between some of the stages in which this pressing up is generally carried out. The annealing then takes place in a similar manner as indicated with respect to the raw disc 1, namely thereby that the bottom is clamped between cooling bodies, or simply by dipping the container so much into a water bath that the bottom is kept cold, while the cylindrical portion is annealed.

Barrel-shaped containers are made according to the invention from two container elements, Fig. 6, made separately as specified above, i. e., with hard bottom portions 2 (if wanted also thicker) and with softer, thinner walls 1ᵇ, the assembling of the portions being carried out by welding them along the edge 27. Fig. 7 shows a ready barrel-shaped container further provided with reinforcing ribbons 28, which may at the same time serve in a known manner as rolling ribbons. One end of the barrel is provided with a bung, a cover or the like 29. In the container shown in Fig. 8 the bottom 2 and the adjacent part of the container wall 1ᵇ is made as specified above. As appears from the drawing, not only the plane portion of the bottom 2 but also the passage to the vertical wall 1ᵇ and the lower portion 2' of the latter is thicker than the wall 1ᵇ. If wanted, the bottom may be provided with a reinforcing ring 26 as shown in the drawing. The neck 20 and the adjacent part of the wall is made in a similar manner as the bottom 2 and the portion 1ᵇ, see Fig. 9, which shows a partly ready neck portion. The lower part thereof is cut off as indicated by the cutting steel 30. The neck 20 itself is kept hard, while the portion 21 is softened in view of the rolling. The elements 21, 1ᵇ are welded together by an annular welding seam at 22 where also a ring 23 is placed to which grips 25 are secured by rivets 24. The ring 23 is placed upon the welding seam partly to conceal the latter and partly to increase the strength of the container at the said place, which is softer and weaker owing to the welding. The invention is not limited to the constructional forms shown and specified above, which are given merely by way of example, but may be performed in other ways without leaving its principles.

I claim:

1. A process for the manufacture of a container from metal having the characteristics of aluminium, which consists in using a hard rolled disc as a blank for the container, annealing only the outer, annular portion of the disc while cooling the central portion, from which the bottom is formed, whereupon the disc is pressed up into the required shape in a known manner.

2. A process according to claim 1, in which the central portion of the disc, corresponding to the container bottom, is kept clamped between two cylindrical bodies of high heat-conductivity, and cooling said bodies by a fluid cooling, while the outer annular portion forming the container wall is being heated for annealing.

3. A method of producing a container of metal having the characteristics of aluminium, consisting in pressing a disc to form side walls of the container, while the central portion forming the bottom retains its original hardness and thickness and said container wall becomes softened and thinner.

4. Process for the manufacture of a metal having the characteristics of aluminium container which consists in using a hard rolled disc for the container, maintaining without deformation the original hardness and thickness of the central portion of the disc to form the bottom of the container, annealing the annular edge portion of said disc and pressing it perpendicularly as regards the bottom to provide sidewalls forming with the bottom a cup-shaped container.

5. A process for the manufacture of a metal container according to claim 4, in which the annealed annular edge portion of the metal disc after having been pressed to provide sidewalls is thinned and smoothed in a bench by means of a number of rolls, some of said rolls serving for thinning the material, while the others serve to prevent the material from bulging out and to smooth the thinned material.

6. A process for the manufacture of a metal container according to claim 4, in which the annealed annular edge portion of the metal disc after having been pressed to provide sidewalls is thinned and smoothed in a bench by means of two rolls, one of said rolls serving for thinning the material, while the other serves to prevent the material from bulging out and to smooth the thinned material.

CHARLES FREDERIK VILHELM FLINT.